US011782877B1

(12) United States Patent
Longshaw (10) Patent No.: US 11,782,877 B1
(45) Date of Patent: Oct. 10, 2023

(54) SEARCH TECHNIQUE FOR NOISY LOGS AND RESULTING USER INTERFACES DISPLAYING LOG ENTRIES IN RANKED ORDER OF IMPORTANCE

(71) Applicant: BANK OF AMERICA CORPORATION, Charlotte, NC (US)

(72) Inventor: Kenneth Longshaw, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 17/746,497

(22) Filed: May 17, 2022

(51) Int. Cl.
*G06F 16/16* (2019.01)
*G06F 16/17* (2019.01)

(52) U.S. Cl.
CPC ........ *G06F 16/1734* (2019.01); *G06F 16/168* (2019.01)

(58) Field of Classification Search
CPC .................... G06F 16/1734; G06F 16/168
See application file for complete search history.

(56) References Cited

U.S. PATENT DOCUMENTS

| | | | |
|---|---|---|---|
| 7,627,559 B2 | 12/2009 | Srivastava et al. | |
| 8,024,308 B2 * | 9/2011 | Jones ................. | G06F 16/2453 707/705 |
| 8,069,374 B2 | 11/2011 | Panigrahy et al. | |
| 8,145,682 B2 | 3/2012 | Mcsherry et al. | |
| 8,352,414 B2 | 1/2013 | Bhamidipaty et al. | |
| 8,635,243 B2 | 1/2014 | Phillips et al. | |
| 8,930,196 B2 | 1/2015 | Jung et al. | |
| 8,943,525 B2 * | 1/2015 | Ito ....................... | H04N 21/251 725/9 |
| 8,949,266 B2 | 2/2015 | Phillips et al. | |
| 9,218,390 B2 | 12/2015 | Feng et al. | |
| 9,323,811 B2 | 4/2016 | Hasan et al. | |
| 9,734,169 B2 | 8/2017 | Redlich et al. | |
| 10,063,570 B2 * | 8/2018 | Muddu ................ | G06N 5/022 |
| 10,110,805 B2 | 10/2018 | Pomerantz et al. | |
| 10,169,443 B2 | 1/2019 | Beisiegel et al. | |
| 10,276,247 B2 | 4/2019 | Alhussien et al. | |
| 10,354,170 B2 | 7/2019 | Fu et al. | |
| 10,597,772 B2 | 3/2020 | Eickelmann et al. | |
| 10,664,757 B2 | 5/2020 | Lastras-Montano et al. | |
| 10,903,981 B1 * | 1/2021 | Tian ..................... | G06F 3/061 |

(Continued)

*Primary Examiner* — Jorge A Casanova
(74) *Attorney, Agent, or Firm* — Moore & Van Allen PLLC; James C. Edwards (57) ABSTRACT

Denoising of technology logs and presentation of resulting user interfaces that display actions/log entries in ranked order of importance. Specifically, technology logs are received for a plurality of entities (e.g., users, devices, systems or the like). In response to receiving the technology logs, a rarity indicator is determined for the various recorded actions/entries in all of the received logs based on the number of occurrences in all of the received logs. Subsequently, an importance indicator is determined for each recorded action in a corresponding technology log based on the rarity indicator and the number of occurrences of the recorded action in the corresponding technology log. In response to determining the importance indicator, user interface(s) are generated and displayed that provide for the actions to be displayed in ranked order of their importance indicators.

14 Claims, 6 Drawing Sheets

(56) References Cited

U.S. PATENT DOCUMENTS

| | | | |
|---|---|---|---|
| 11,017,047 B2 | 5/2021 | White et al. | |
| 11,020,036 B2 | 6/2021 | Dawoud et al. | |
| 2003/0125904 A1* | 7/2003 | Ueki | G06F 11/3616 |
| | | | 714/E11.212 |
| 2012/0246303 A1* | 9/2012 | Petersen | G06F 16/1734 |
| | | | 709/224 |
| 2015/0278213 A1* | 10/2015 | Anand | G06F 16/24578 |
| | | | 707/723 |
| 2015/0278214 A1* | 10/2015 | Anand | G06F 16/338 |
| | | | 707/748 |
| 2020/0097560 A1* | 3/2020 | Kulkarni | G06F 16/248 |
| 2020/0311738 A1 | 10/2020 | Gupta et al. | |
| 2021/0133054 A1* | 5/2021 | Alcorn | G06F 11/3034 |

* cited by examiner

| USER INTERFACE 600-1 | | |
|---|---|---|
| Action | Value | Importance Indicator |
| Browse | ZZZZ.org | 21.65154 |
| Browse | XXXX.org | 19.43583 |
| Browse | ABCD.com | 18.97652 |
| Browse | NNNN.io | 17.32216 |
| Browse | RERE.com | 17.02459 |
| Browse | MMMM.com | 16.87878 |
| Browse | EFGH.org | 16.54578 |
| Browse | IJKL.com | 15.87673 |
| Browse | MNOP.com | 15.77732 |
| Browse | QRST.com | 12.87772 |
| Browse | UVWX.com | 12.23214 |
| Browse | ZABC.com | 9.43436 |

| USER INTERFACE 600-2 | | |
|---|---|---|
| Action | Value | Importance Indicator |
| Login | KA123ZE | 33.95727 |
| VPN | KA123RT | 31.32104 |
| Browse | ZZZZ.org | 21.65154 |
| Runs | DEDE.exe | 21.39273 |
| Browse | XXXX.org | 19.43583 |
| Browse | ABCD.com | 18.97652 |
| Runs | FTFT.exe | 18.87775 |
| Runs | GYGY.exe | 18.66661 |
| Email | (Name) | 17.45454 |
| Browse | NNNN.io | 17.32216 |
| Browse | RERE.com | 17.02459 |
| Browse | MMMM.com | 16.87878 |

FIG. 6

SEARCH TECHNIQUE FOR NOISY LOGS AND RESULTING USER INTERFACES DISPLAYING LOG ENTRIES IN RANKED ORDER OF IMPORTANCE

FIELD OF THE INVENTION

The present invention is related to denoising technology logs and, more denoising technology logs through use of term frequency-inverse document frequency (TF-IDF) analysis and subsequently present user interfaces that display a ranked listing of the recorded actions in the technology logs in terms of their respective importance

BACKGROUND

Technology logs, such as logs that record actions taken by a computing system, specific computing devices and/or users interfacing with a computing device typically contain a plethora of entries, i.e., recorded actions. Many of these entries are associated with background actions, such as actions security actions, maintenance actions and the like. Even when a computing device is idle and/or a user is not actively using the computing device, background actions are being recorded in technology logs. As such, technology logs tend to voluminous, especially when the contain entries for recorded over an extended period of time.

Technology logs are used to perform analysis on computing systems/devices, entities that control computing systems/devices and/or users of computing systems/devices. For example, cybersecurity entities within a corporate entity may rely on technology logs as a means of tracking user/employee activity to determine whether the user/employee is conducting activities that are outside of their employment functions. In this regard, the analysis is concerned with determining actions that are outliers.

However, since the technology logs tend to include an enormous number of entries it is often difficult, and in some instances impossible, to decipher which of the recorded actions/entries are meaningful in terms of the analysis. If the technology logs are sorted merely by the number occurrences of an action, the result would not typically provide meaningful data, since the actions with the most occurrences may be background actions and/or common actions performed by all devices and/or users.

Moreover, in large entities there are various different types of users. As such, actions that are common to one group of users within a large entity (e.g., specific employment type or division/line of business within the large entity) may ne be common to other groups of users.

Therefore, a need exists to develop systems, methods, computer program products and the like that serve to denoise technology logs and present to the analyst meaning data. In this regard, a need exists to provide action/log entries that identify actions that are important to the analysis (i.e., outliers or repeated occurrences of otherwise rare actions/log entries). Moreover, a need exists to ensure that identification of important actions takes into the attributes of the computing system/device and/or user (i.e., the standard actions of the computing system/device and/or user that are germane to the intended use of computing system/device or function of the user).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for denoising technology logs and presenting resulting user interfaces that display actions/log entries in ranked order of importance.

Specifically, technology logs are received for a plurality of entities (e.g., users, devices, systems or the like). The technology logs may be specific to one type of action or a plurality of actions. In instances in which the technology logs are action-type specific, a consolidated log may be created or the results of the denoising may provide for presenting consolidated results that display actions from all related technology in a ranked order of importance.

In response to receiving the technology logs, a rarity indicator is determined for the various recorded actions/entries in all of the received logs based on the number of occurrences in all of the received logs. Subsequently, an importance indicator is determined for each recorded action in a corresponding technology log based on the rarity indicator and the number of occurrences of the recorded action in the corresponding technology log. In specific embodiments of the invention the importance indicator is determined by implementing a Term Frequency-Inverse Document Frequency (TF-IDF) algorithm and, in preferred embodiments of the invention, a Best Matching (BM)25 TF-IDF algorithm.

In response to determining the importance indicator, user interface(s) are generated and displayed that provide for the actions to be displayed in ranked order of their importance indicators. In some instances, the actions displayed are specific in type, while in other instances the actions displayed are all-encompassing.

A system for denoising technology logs and displaying results thereof defines first embodiments of the invention. The system includes a first computing platform having a first memory and one or more first computing processor devices in communication with the first memory. The first memory stores a technology log denoising application that is executable by at least one of the one or more first computing processor devices. The technology log denoising application is configured to receive, on a predetermined interval, a plurality of one of more technology logs, each of the plurality of one of more technology logs comprising recorded actions taken by a specific entity over the predetermined interval. In response to receiving the plurality of at least on technology log, the technology log denoising application is configured (i) determine a rarity indicator for each of the recorded actions based at least on a volume of occurrences of a corresponding recorded action in the plurality of one of more technology logs, and (ii) determine an importance indicator for each recorded action in each of the plurality of one of more technology logs based on the rarity indicator and a volume of occurrences of a corresponding action in a corresponding one of the one of more technology logs.

The system additionally includes a second computing platform having a second memory and one or more second computing processor devices in communication with the second memory. The second memory stores a user interface application that is executable by at least one of the one or more second computing processor devices. The user interface application is configured to, in response to the technology log denoising application determining the importance indicator, trigger one or more user interfaces to be displayed. Each of the one or more user interfaces, for a corresponding specific entity, include the recorded actions from one of more technology logs in ranked order of the importance indicator with a most important recorded action occurring first in the ranked order.

In specific embodiments of the system, the one of more technology logs includes a plurality of technology logs. In specific related embodiments of the system, the technology log denoising application is further configured to combine the plurality of technology logs into a consolidated technology log for each of the specific entities. In such embodiments of the system, the technology log denoising application is further configured to determine the importance indicator for each recorded action in each of the plurality of the consolidated technology logs based on the rarity indicator and a volume of occurrences of a corresponding action in a corresponding one of the consolidated technology logs. In other specific related embodiments of the system, the user interface application is further configured to display, for the corresponding specific entity, one or more user interfaces that include the recorded actions from the plurality of technology logs in ranked order of the importance indicator with a most important recorded action occurring first in the ranked order, wherein the one or more user interfaces include (i) a single user interface that includes the recorded actions from the plurality of technology logs in ranked order of the importance indicator, or (ii) a plurality of user interfaces, each of the plurality of user interfaces including the recorded actions from one of the plurality of technology logs in ranked order of the importance indicator.

In further specific embodiments of the system, the technology log denoising application is configured to determine the rarity indicator for each of the recorded actions based at least on (i) a volume of occurrences of a corresponding recorded action in the plurality of one of more technology logs and (ii) a volume of occurrences of the corresponding recorded action in a plurality of the one of more technology logs received for at least one prior instance of the predetermined interval (i.e., previous iterations of the technology logs).

In other specific embodiments of the system, the technology log denoising application is configured to determine the importance indicator using a Term-Frequency-Inverse Document Frequency (TF-IDF) algorithm, in specific embodiments the TF-IDF algorithm is a Best Matching (BM) 25 TF-IDF algorithm.

In still further specific embodiments of the system, the specific entity is a technology user, such as an employee or the like, and the one of more technology logs includes one or more of (i) a computing device log that records computing devices accessed by the technology user, (ii) computer program log that records computing programs executing on the computing devices while accessed by the technology user, (iii) a computing device input log that records inputs made to the computing devices by the technology user, (iv) a website log that records websites accessed by the technology user, (v) one or more communication logs that record addresses or identifiers of who the technology user has communicated with, and (vi) one or more building access logs that record entries and exits into a building or a building area by the technology user. In related embodiments the system further includes a third computing platform having a third memory and one or more third computing processor devices in communication with the third memory. The third memory stores a technology user investigation application that is configured to analyze, for each technology user, the ranked order of the importance indicators for the recorded actions in the one of more technology logs to determine whether the corresponding technology user is a candidate for suspicious activity investigation.

In other specific embodiments of the system, the specific entity is a resource holding entity and the one of more technology logs include logs that record technology actions taken by the resource holding entity, while in other embodiments of the system, the specific entity is a resource account holder and the one of more technology logs include logs that record resource account actions taken by the resource account holder.

A computer-implemented method for denoising technology logs and displaying results thereof defines second embodiments of the invention. Th computer-implemented method is executed by one or more computing processor devices. The computer-implemented method includes receiving, on a predetermined interval, a plurality of one of more technology logs, each of the plurality of one of more technology logs comprising recorded actions taken by a specific entity over the predetermined interval. The computer-implemented method further includes determining a rarity indicator for each of the recorded actions based at least on a volume of occurrences of a corresponding recorded action in the plurality of one of more technology logs. In addition, the computer-implemented method includes determining an importance indicator for each recorded action in each of the plurality of one of more technology logs based on the rarity indicator and a volume of occurrences of a corresponding action in a corresponding one of the one of more technology logs. Further, the computer-implemented method includes, in response to determining the importance indicator, triggering one or more user interfaces to be displayed, for a corresponding specific entity. The one or more user interfaces include the recorded actions from one of more technology logs in ranked order of the importance indicator with a most important recorded action occurring first in the ranked order.

In specific embodiments of the computer-implemented method, receiving, on the predetermined interval, the plurality of one of more technology logs further includes receiving, on the predetermined interval, the plurality of multiple technology logs. In related embodiments the computer-implemented method further includes combining the multiple technology logs into a consolidated technology log for each of the specific entities. In such embodiments of the computer-implemented method, determining the importance indicator further includes determining the importance indicator for each recorded action in each of the consolidated technology logs based on the rarity indicator and a volume of occurrences of a corresponding action in a corresponding one of the consolidated technology logs.

In other specific embodiments of the computer-implemented method, determining the importance indicator further comprises implementing a Term-Frequency-Inverse Document Frequency (TF-IDF) algorithm to determine the importance indicator for each recorded action in each of the plurality of one of more technology logs.

In further specific embodiments of the computer-implemented method, the specific entity is a technology user, e.g., an employee or the like and the one of more technology logs includes one or more of (i) a computing device log that records computing devices accessed by the technology user, (ii) computer program log that records computing programs executing on the computing devices while accessed by the technology user, (iii) a computing device input log that records inputs made to the computing devices by the technology user, (iv) a website log that records websites accessed by the technology user, (v) one or more communication logs that record addresses or identifiers of who the technology user has communicated with, and (vi) one or more building access logs that record entries and exits into a building or a building area by the technology user.

A computer program product including a non-transitory computer-readable medium defines third embodiments of the invention. The computer-readable medium has sets of codes for causing one or more computing processing devices to receive, on a predetermined interval, a plurality of one of more technology logs, each of the plurality of one of more technology logs comprising recorded actions taken by a specific entity over the predetermined interval. The sets of codes further cause the computing processing device(s) to determine a rarity indicator for each of the recorded actions based at least on a volume of occurrences of a corresponding recorded action in the plurality of one of more technology logs. In addition, the sets of codes cause the cause the computing processing device(s) to determine an importance indicator for each recorded action in each of the plurality of one of more technology logs based on the rarity indicator and a volume of occurrences of a corresponding action in a corresponding one of the one of more technology logs. Further, the sets of codes cause the computing processing device(s) to, in response to determining the importance indicator, trigger one or more user interfaces to be displayed, for a corresponding specific entity. The one or more user interfaces include the recorded actions from one of more technology logs in ranked order of the importance indicator with a most important recorded action occurring first in the ranked order.

In specific embodiments of the computer program product, the sets of codes for causing the one or more computing processor devices to receive, on the predetermined interval, the plurality of one of more technology logs further comprises receiving, on the predetermined interval, the plurality of multiple technology logs. In such embodiments of the computer program product, the computer-readable medium further includes a set of codes for causing the one or more computer processor devices to combine the multiple technology logs into a consolidated technology log for each of the specific entities. In such embodiments of the computer program product, the set of codes for causing the one or more computing processor devices to determine the importance indicator further comprises sets of codes for causing the one or more computing processor devices to determine the importance indicator for each recorded action in each of the consolidated technology logs based on the rarity indicator and a volume of occurrences of a corresponding action in a corresponding one of the consolidated technology logs.

In other specific embodiments of the computer program product, the set of codes for causing the one or more computing processing devices to wherein determine the importance indicator further includes the set of codes for causing the one or more computing processing devices to implement a Term-Frequency-Inverse Document Frequency (TF-IDF) algorithm to determine the importance indicator for each recorded action in each of the plurality of one of more technology logs.

Thus, according to embodiments of the invention, which will be discussed in greater detail below, the present invention provides for denoising technology logs and presenting resulting user interfaces that display actions/log entries in ranked order of importance. Specifically, technology logs are received for a plurality of entities (e.g., users, devices, systems or the like). In response to receiving the technology logs, a rarity indicator is determined for the various recorded actions/entries in all of the received logs based on the number of occurrences in all of the received logs. Subsequently, an importance indicator is determined for each recorded action in a corresponding technology log based on the rarity indicator and the number of occurrences of the recorded action in the corresponding technology log. In response to determining the importance indicator, user interface(s) are generated and displayed that provide for the actions to be displayed in ranked order of their importance indicators. As a result, since the most important actions in the technology logs have been identified, meaningful analysis can be performed on the actions to readily and efficiently decipher whether or not the purpose of the analysis is met.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for denoising technology logs and presenting resulting user interfaces that display actions/log entries in ranked order of importance. As a result of the denoising, analysts are presented with meaningful data that allows for efficient and reliable determinations as to the purpose of the analysis.

Specifically, technology logs are received for a plurality of entities (e.g., users, devices, systems or the like). The technology logs may be specific to one type of action or a plurality of actions. In instances in which the technology logs are action-type specific, a consolidated log may be created or the results of the denoising may provide for presenting consolidated results that display actions from all related technology in a ranked order of importance.

In response to receiving the technology logs, a rarity indicator is determined for the various recorded actions/entries in all of the received logs based on the number of occurrences in all of the received logs. Subsequently, an importance indicator is determined for each recorded action in a corresponding technology log based on the rarity indicator and the number of occurrences of the recorded action in the corresponding technology log. In specific embodiments of the invention the importance indicator is determined by implementing a Term Frequency-Inverse Document Frequency (TF-IDF) algorithm and, in preferred embodiments of the invention, a Best Matching (BM)25 TF-IDF algorithm.

In response to determining the importance indicator, user interface(s) are generated and displayed that provide for the actions to be displayed in ranked order of their importance indicators. In some instances, the actions displayed are specific in type, while in other instances the actions displayed are all-encompassing.

Figure 1:
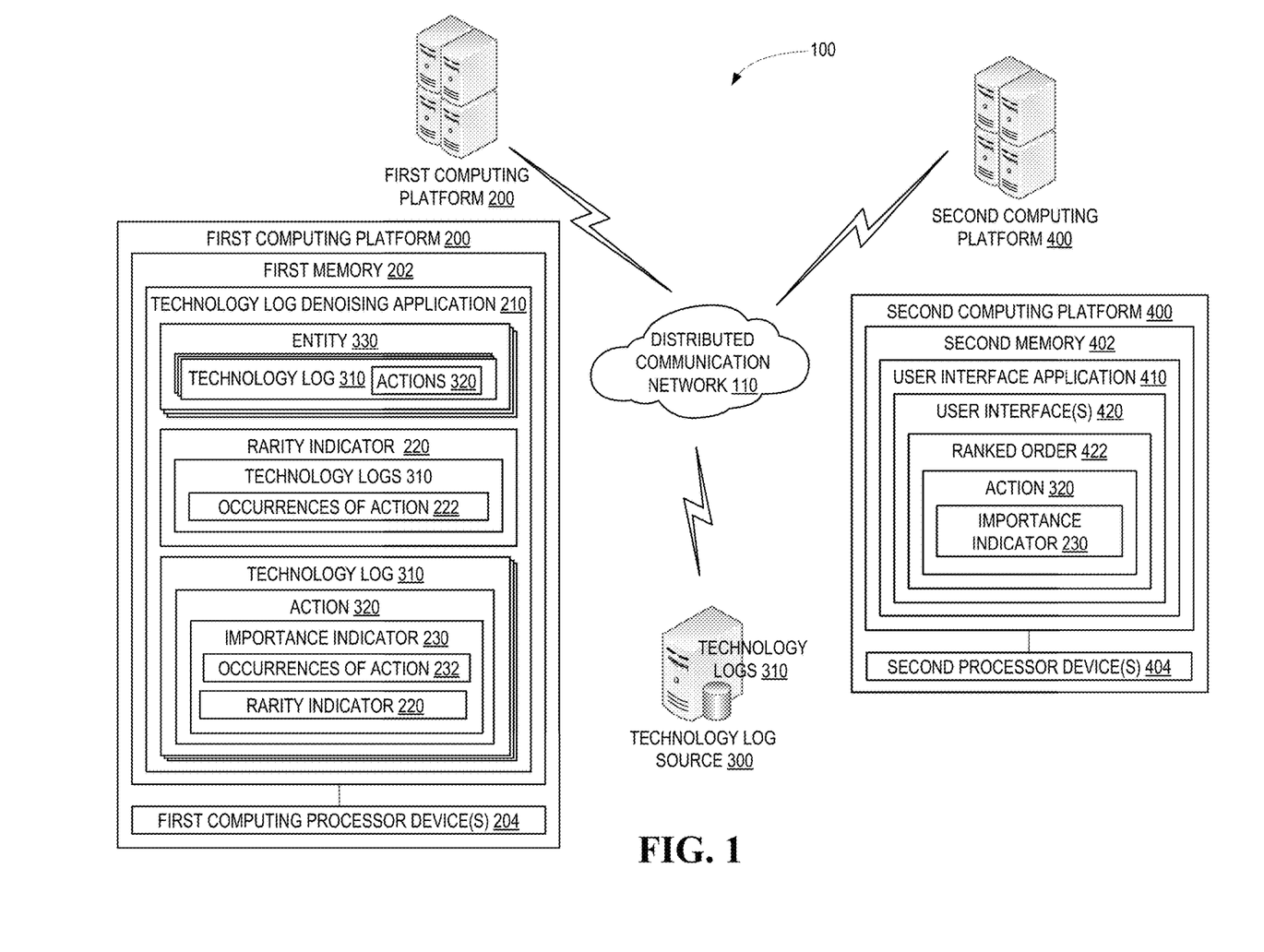
FIG. 1 is a schematic/block diagram of a system for denoising technology logs and providing user interfaces that provide an importance-based ranked order of logged actions, in accordance with some embodiments of the present disclosure.

Turning now to the figures, FIG. 1 a schematic/block diagram is provided of a system 100 for denoising technology logs and providing user interfaces that display an importance-based ranked order of actions/logged entries, in accordance with embodiments of the present invention. System 100 includes first computing platform 200 having a first memory 202 and one or more first computing processor devices 204 in communication with the first memory 202. First memory 202 stores technology log denoising application 210 that is executable by at least one of the one or more first computing processor devices 204. Technology log denoising application 210 is configured to receive, on a predetermined interval (e.g., weekly, monthly or the like) from a technology source 300 (via distributed communication network 110, such as the Internet, intranet(s), cellular network or the like), a plurality of one or more technology logs 310. Each of the technology logs 310 include recorded actions 320, otherwise referred to as log entries, that have been taken by a specific entity 330 (e.g., a user, a computing system/device or the like) over the predetermined interval. In specific embodiments of the system multiple technology logs 310 are received for each specific entity 330, with each of the technology logs pertaining to a specific type of action (e.g., computer log-on, electronic communications sent/received, website access and the like).

In addition, technology log denoising application 210 is configured to determine a rarity indicator 220 for each of the recorded actions in the plurality of technology logs 310 based at least on the volume of occurrences (i.e., frequency) 222 of a corresponding recorded action in the plurality of technology logs. In specific embodiments of the system, the rarity indicators 220 for each of the recorded actions 320 are not only based on the volume of occurrences (i.e., frequency) 222 of a corresponding recorded action in the plurality of technology logs 310 (i.e., the technology logs during the predetermined interval) but also based on one or more previously received technology logs (i.e., technology logs received during previous predetermined intervals (i.e., last week, last month or the like).

Further, technology log denoising application 210 is configured to determine an importance indicator 230 for each recorded action 320 in each of the plurality technology logs 310 based on the rarity indicator 220 and a volume of occurrences (i.e., frequency) 232 of a corresponding action 320 in a corresponding one of the technology logs 310. In specific embodiments of the system, importance indicator 230 is determined by multiplying the rarity indicator 220 for a recorded action 320 by the volume of occurrences (i.e., frequency) 232 of the recorded action 320 in a corresponding one of the technology logs 310 (i.e., a log associated with a specific entity 330, such as a user/employee/resource account holder, resource holding entity or the like).

System 100 additionally includes second computing platform 400 having a second memory 402 and one or more second computing processor devices 404 in communication with the second memory 202. First memory 202 stores user interface application 410 that is executable by at least one of the one or more second computing processor devices 404. User interface application 410 is configured to, in response to the technology log denoising application 210 determining the importance indicators 230, trigger one or more user interfaces 420 to be displayed. Each of the one or more user interfaces 420, for a corresponding specific entity 330, include the recorded actions 320 from at least one of the technology logs 310 in ranked order 422 of the importance indicator 230 with a most important recorded action 320 occurring first in the ranked order 422. In this regard, a user interface 420 may be configured to display the recorded actions 320 in importance indicator-based ranked order 422 from one specific action type technology log and/or display the recorded actions 320 in importance indicator-based ranked order 422 from all of the technology logs 310 associated with the entity 330 (i.e., all recorded actions 320 taken/made by the entity 330).

Figure 2:
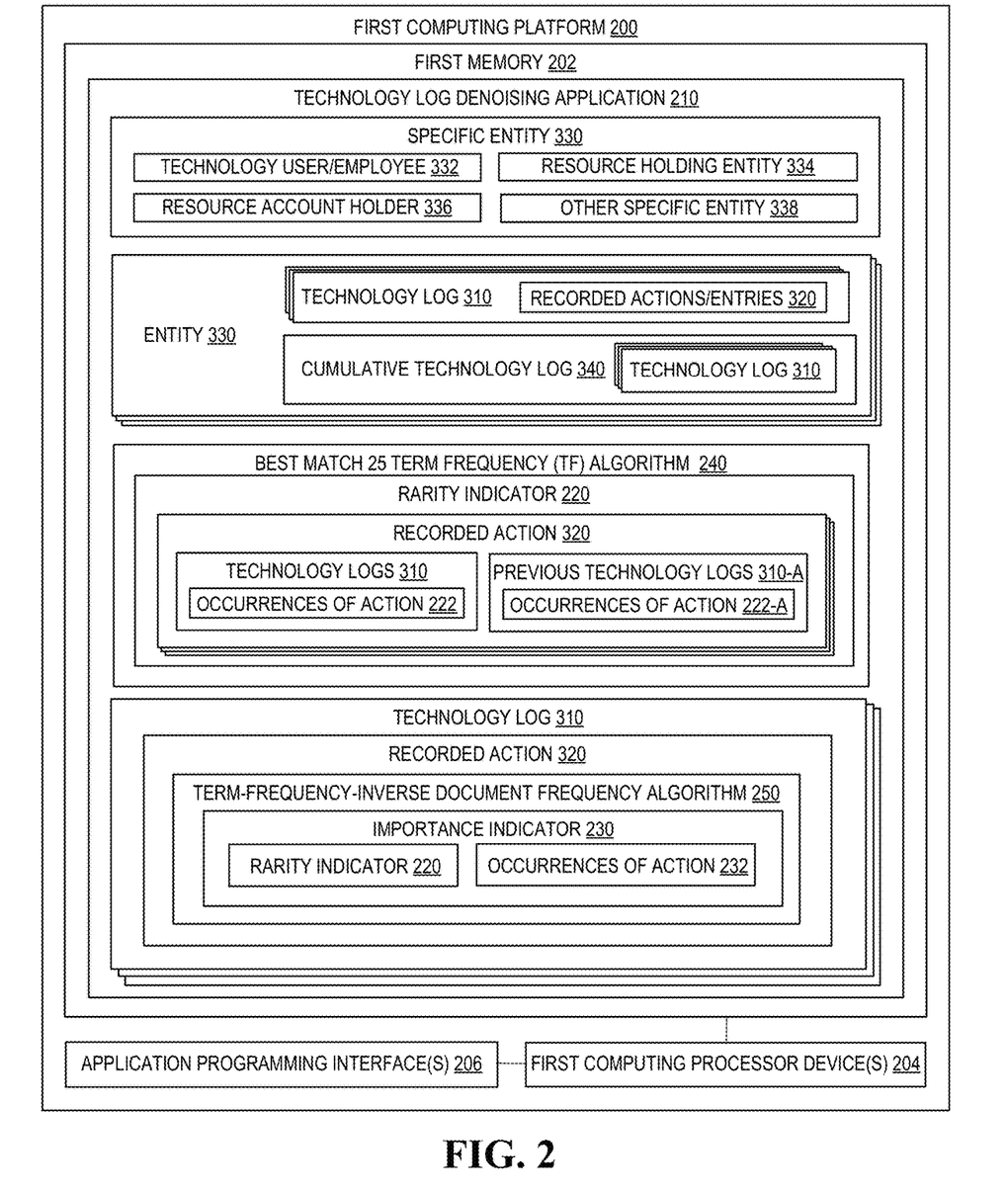
FIG. 2 is a block diagram of a computing platform including a technology log denoising application, in accordance with some embodiments of the present disclosure.

Referring to FIG. 2, a block diagram is presented of first computing platform 200 including technology log denoising application 210, in accordance with embodiments of the present invention. In addition to providing greater details of the first computing platform 200, FIG. 2 highlights various alternate embodiments of the invention. The first computing platform 200 may comprise one or multiple devices, such as application servers or the like that are in wired and/or wireless communication with one another. First computing platform 200 includes first memory 202, which may comprise volatile and non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 also includes one or more computing processor devices 204, which may be an application-specific integrated circuit ("ASIC"), or other chipset, logic circuit, or other data processing device. First computing processor device(s) 114 may execute one or more application programming interface (APIs) 206 that interface with any resident programs, such as technology log denoising application 210 or the like, stored in first memory 202 of first computing platform 200 and any external programs. First computing processor devices(s) 204 may include various processing subsystems (not shown in FIG. 2) embodied in hardware, firmware, software, and combinations thereof, that enable the functionality of first computing platform 200 and the operability of first computing platform 200 on a network, such as distributed communication network 110 (shown in FIG. 1) and the like. For example, processing subsystems allow for initiating and maintaining communications and exchanging data with other networked devices. For the disclosed aspects, processing subsystems of first computing platform 200 may include any subsystem used in conjunction with technology log denoising application 210 and related tools, routines, sub-routines, algorithms, sub-algorithms, sub-modules thereof.

In specific embodiments of the present invention, first computing platform 200 may additionally include a communications module (not shown in FIG. 2) embodied in hardware, firmware, software, and combinations thereof, that enables electronic communications between the first computing platform 200 and other networks and network devices. Thus, communication module may include the requisite hardware, firmware, software and/or combinations thereof for establishing and maintaining a network communication connection with one or more devices and/or networks.

Memory 202 of first computing platform 200 stores technology log denoising application 210 that is configured to determine importance indictors for each action/logged entry in a technology log. Specifically, technology log denoising application 210 is configured to receive, on a predetermined interval (e.g., weekly, monthly or the like) from a technology source 300, a plurality of one or more technology logs 310. Each of the technology logs 310 include recorded actions 320, otherwise referred to as log entries, that have been taken by a specific entity 330. The specific entity 330 may be a technology user 332, such as an employee, a resource holding entity 334 (e.g., a financial institution), a resource account holder (e.g., a financial institution account holder) or any other specific entity 338, such as a specific system of computing device.

In specific embodiments of the system, multiple technology logs 310 are received for each specific entity 330, with each of the technology logs pertaining to a specific type of action (e.g., computer log-on, electronic communications sent/received, website access and the like). In those embodiments of the invention, in which multiple technology logs 310 are received, each pertaining to a specific type of action, the technology logs 310 may be combined into one cumulative technology log 340 for purposes of determining importance indicators 230 for all of the recorded actions 320 in all of the technology logs 310 and subsequently presenting a cumulative importance indicator-based ranked order of all of the recorded actions 320.

In addition, the plurality of technology logs 310 that are received may encompass a wide spectrum of entities or may be filtered to address only entities that meet the filtering criteria. For example, the technology logs 310 may encompass all of the users/employees in a large enterprise or the technology logs may be filtered such only technology logs associated are associated with user/employees of a specific division/line-of-business (LOB) within the large enterprise or a specific job title/classification within the large enterprise. Alternatively, the plurality of technology logs that are received may encompass the wide spectrum of entities and may subsequently be paired down/filtered based on a desired characteristic of the entities (e.g., same job title/classification or the like) prior to determining rarity and importance indicators (e.g., applying an TF-IDF algorithm), so that the resulting rarity and importance indicators are more focused as to the importance of the actions relative to the desired characteristic of the entity.

In addition, technology log denoising application 210 is configured to determine a rarity indicator 220 for each of the recorded actions in the plurality of technology logs 310 based at least on the volume of occurrences (i.e., frequency) 222 of a corresponding recorded action in the plurality of technology logs. In specific embodiments of the system, the rarity indicators 220 for each of the recorded actions 320 are not only based on the volume of occurrences (i.e., frequency) 222 of a corresponding recorded action in the plurality of technology logs 310 (i.e., the technology logs during the predetermined interval) but also based on one or more previously received technology logs 310-A (i.e., technology logs received during previous predetermined intervals (i.e., last week, last month or the like), specifically the volume of occurrences (i.e., frequency) 222-A of a corresponding recorded action in the plurality of previously received technology logs 310-A.

In specific embodiments of the invention, the rarity indicator 220 is determined as part of Term Frequency-Inverse Document Frequency (TF-IDF) algorithm. While TF-IDF algorithms are typically used to measure the originality of a word in a document by comparing the number of times a word appears in a document to the number of documents that the word appears, in this instance TF-IDF is being used to measure the importance of an action in a technology log by comparing the number of times the action appears in the technology log to the number of technology logs the action appears. In specific embodiments, as discussed infra. in relation to FIG. 4, the Term Frequency (TF) portion of the algorithm, which defines the rarity indicator 220 is determined using a Best Matching 25 (BM25) ranking function 250.

Further, technology log denoising application 210 is configured to determine an importance indicator 230 for each recorded action 320 in each of the plurality technology logs 310 based on the rarity indicator 220 and a volume of occurrences (i.e., frequency) 232 of a corresponding action 320 in a corresponding one of the technology logs 310. In specific embodiments of the system, importance indicator 230 is determined by multiplying the rarity indicator 220 for a recorded action 320 by the volume of occurrences (i.e., frequency) 232 of the recorded action 320 in a corresponding one of the technology logs 310 (i.e., a log associated with a specific entity 330, such as a user/employee/resource account holder, resource holding entity or the like).

In specific embodiments of the system, the importance indicator 230 is determined by implementing a Term Frequency—Inverse Document Frequency (TF-IDF) algorithm 250, such BM25 TF-IDF or the like. In such embodiments of the invention, the importance indicator (TF-IDF) is calculated by multiplying Term Frequency (TF) (i.e., the number of times a recorded action 320 appears in a technology log 310 by the Inverse Document Frequency (IDF), where IDF is defined as a logarithmic value, specifically:

$$\text{Log} \frac{1+n}{1+df(d, t)} + 1$$

where n is the number of technology logs and df(d,t) is the technology log frequency of the action.

Figure 3:
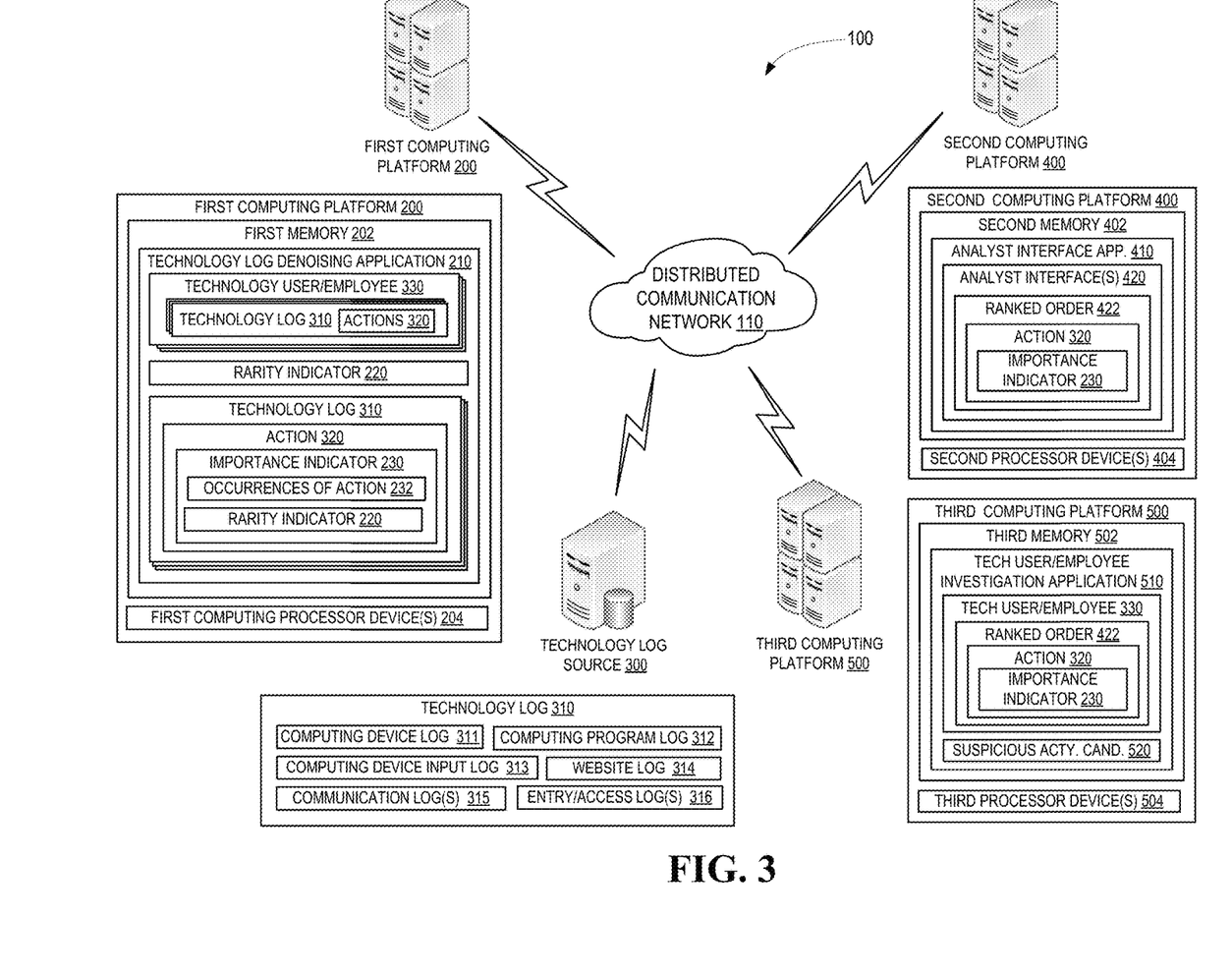
FIG. 3 is a schematic/block diagram of a specific system for denoising technology logs associated with users/employees and providing user interfaces that provide an importance-based ranked order of logged actions, in accordance with some embodiments of the present disclosure.

Referring to FIG. 3, a schematic/block diagram is provided of a system 100 for denoising technology logs and providing user interfaces that display an importance-based ranked order of actions/logged entries, in accordance with embodiments of the present invention. In the system 100 of FIG. 3, the technology logs 310 are logs associated with user/employee actions. For example, the technology logs 310 may include, but are not limited to, one or more of computing device log 311 that records what computing devices the user/employee has accessed/logged into; computing program log 312 that records what computing programs/applications the user/employee has executed while accessing a computing device; computing device input log 313 that records every input action that the user/employee makes while accessing a computing device; website log 314 that records every website that a use/employee has browsed; communication log(s) 315 that record what email addresses or telephone numbers the user/employee has communicated with (i.e., received or sent email to or received or made telephone calls) and entry/access logs 316 that record physical entry into an area or exit from an area.

In the illustrated embodiment of FIG. 3, the first computing platform 200 and the second computing platform are consistent with those discussed in relation to FIG. 1 and for purposes of conciseness will not be discussed here in relation to FIG. 3.

In specific embodiments the system 100 also includes a third computing platform 500, which includes a third memory 502 and one or more third processor devices 504 in communication with the third memory 502. Third memory 510 includes technology user/employee investigation application 510 that is executable by at least one of the one or more computing processor devices 510. The technology user/employee investigation application 510 is configured to analyze, for each technology user, the importance indicators for the recorded actions in the one of more technology logs to determine whether the corresponding technology user is a candidate for suspicious activity investigation. In this regard, technology user/employee investigation application 510 is able to determine, using machine learning capabilities or the like, whether the technology user may be conducting suspicious activities based on the uniqueness and frequency of specific actions (i.e., recorded actions with the highest importance indicators). Once a technology user has been identified as a candidate for suspicious activity, additional covert monitoring of the technology user may be triggered along, with triggering of other heightened security measures, such as prohibiting access to certain features of the internal computing network, requiring heightened security credentials to access certain features/functions and the like.

Figure 4:
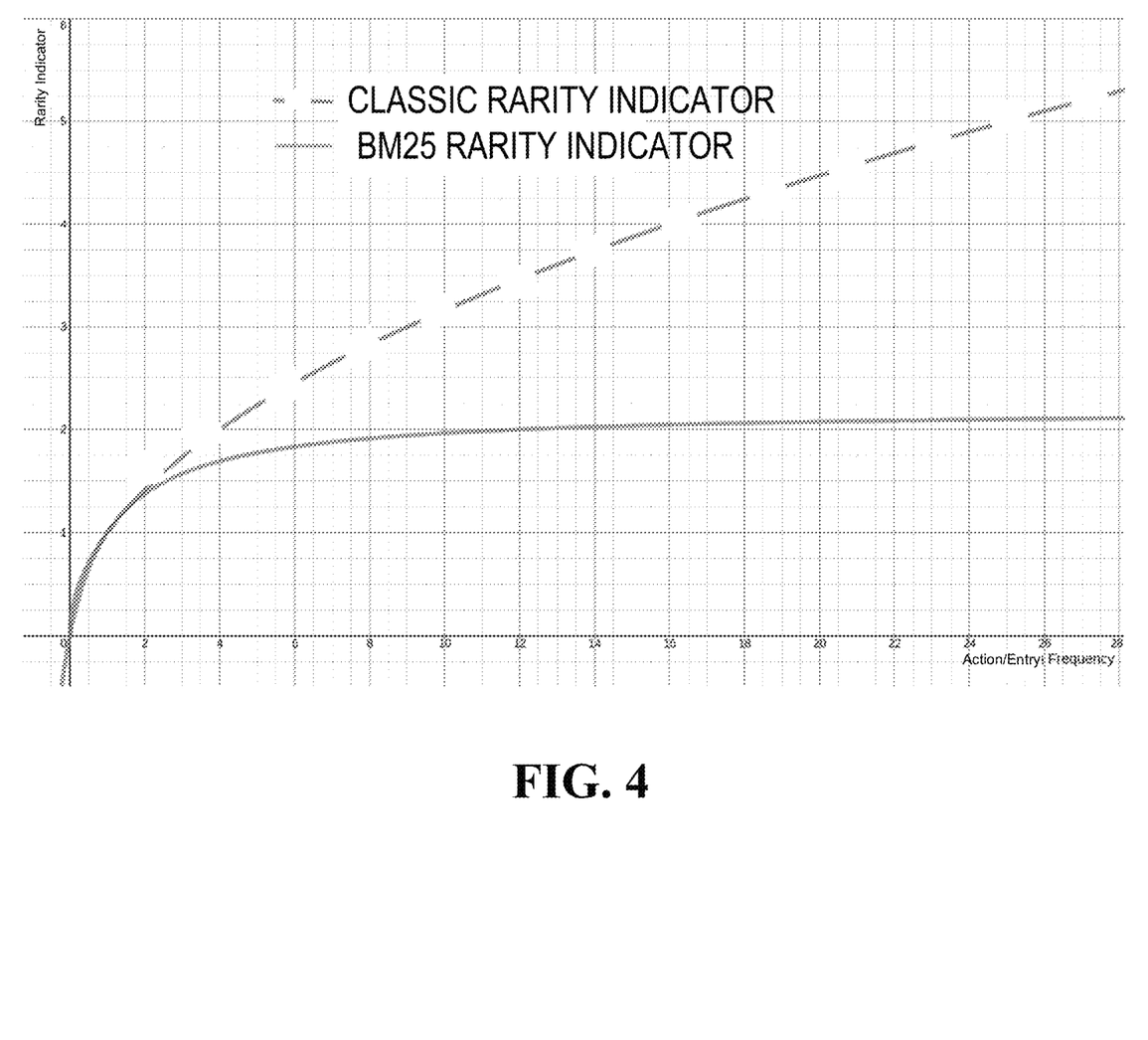
FIG. 4 is a line graph depicting difference in importance indicator when using a conventional term frequency (TF) algorithm versus a Best Match 25 IF algorithm, in accordance with embodiment s of the present invention.

Referring to FIG. 4, a line graph is presented that illustrates the comparison between using a classic/conventional TF-IDF algorithm versus an Okapi Best Matching 25 (BM25)-type TF-IDF algorthim for purposes of subsequently determining importance indicators. In the illustrated line graph the x-axis indicates action/logged entry occurrences/frequency and the y-axis indicates the rarity indicator. The broken-line curve illustrates use of the BM 25-type TF-IDF algorthim, while the unbroken-line curve illustrates use of the conventional TF-IDF algorithm. In the instance of the BM-25-type TF-IDF algorithm an upper bound is placed on the rarity indicator (i.e., action frequency), specifically, as shown in FIG. 4, once the volume of occurrences exceeds about 14, the rarity indicator has an upper bound of about 2.1-2.2. By placing such an upper bound on the rarity indication, embodiments of the present invention, compensate for both very long and short (in terms of recorded actions/entries) technology logs.

Figure 5:
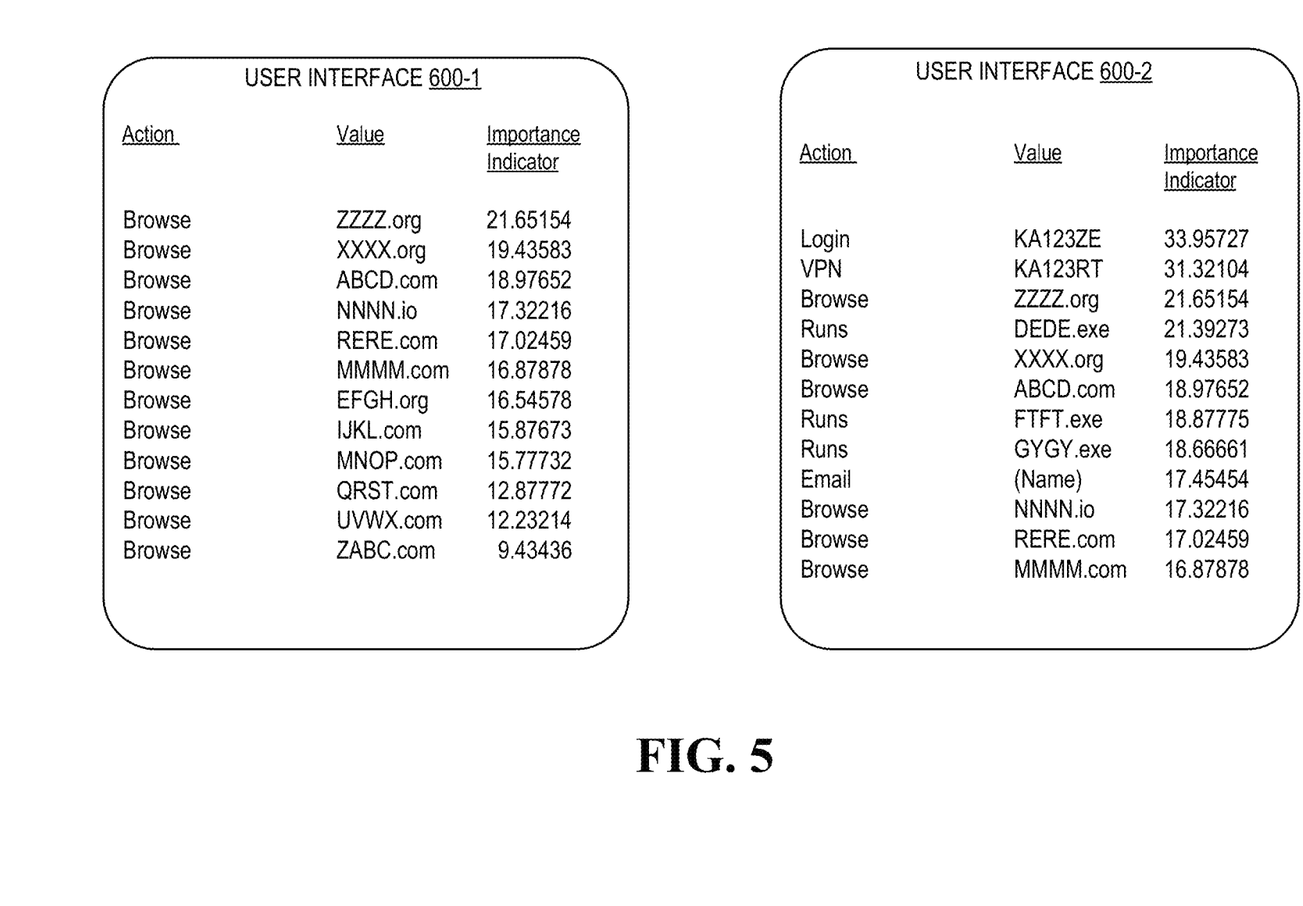
FIG. 5 depicts two user interfaces configured to display (i) a specific technology log's actions in ranked order of importance indicator and (ii) multiple technology log actions consolidated in a ranked order of importance indicators, in accordance with embodiments of the present invention.

Referring to FIG. 5, exemplary user interfaces 600-1, 600-2 are depicted that illustrate presentation of an importance-indicator ranked listing of technology logged actions, in accordance with embodiments of the present invention. Specifically, user interface 600-1 depicts a ranked listing of logged web browsing actions (i.e., web sites accessed) for a user, which is ranked in terms of highest importance indicator. In the example shown in FIG. 5, website "ZZZZ.org" has the highest importance indicator at "21.65154", meaning that that website "ZZZZ.org" is not typically accessed by similar users (i.e., high rarity indicator), but, as indicated by the user's web browsing log, has been accessed at least once and maybe more by this specific user.

User interface 600-2 depicts a composite ranked listing of all technology logged actions for a user, which is also ranked in terms of highest importance indicator. In the example shown in FIG. 5, user interface 600-2 shows that computer login to a computer having identifier "KA123ZE" has the highest importance indicator "33.95727".

It should be noted that user interface 600-1 may be triggered in response to receiving a specific technology log associated with web browsing actions and subsequently determining the rarity indicator and importance indicator (i.e., applying a TF-IDF algorithm) for the actions in the specific log. Alternatively, user interface 600-1 may be generated based on applying an action filter to user interface 600-2. User interface 600-1 may be based on (i) receiving a composite technology log that includes all of the logged/recorded actions for an entity prior to determining rarity and importance indicators for the logged actions in the composite technology log, (ii) receiving multiple action-specific technology logs and compiling a composite technology log prior to determining rarity and importance indicators prior to determining rarity and importance indicators for the logged actions in the composite technology log, or (iii) receiving multiple action-specific technology logs, determining rarity and importance indicators for each action-specific technology log and subsequently compiling the composite user interface 600-2.

One of ordinary skill in the art will realize that the user interfaces 600-1 and 600-2 shown in FIG. 5 are limited in terms of data fields, so as to hone in on the inventive features and, in practice, user interfaces 600-1 and 600-2 may include additional fields containing additional data. For example, the user interfaces may be configured with a field that indicates the number of occurrences of the value in the technology log of the entity and/or the number of occurrences of the value in the plurality of technology logs (i.e., number of occurrences for all of the entities/users). Moreover, the fields may be sortable and/or the basis for applying filters to alter the data that is presented in the user interfaces 600-1 and 600-2. Moreover, the user interfaces 600-1 and 600-2 may be configured with a search feature, such that a user may input a specific value (e.g., computer/VPN identifier, website, email address or the like) to readily find the importance indicator associated with that specific value Referring to FIG. 6, a flow diagram is presented of a method 700 for apparatus denoising technology logs and, in response, presenting user interfaces that depict an importance-based ranked order of the actions/events in the technology logs, in accordance with embodiments of the present invention. At Event 710, a plurality of one or more technology logs are received on a predetermined interval (e.g., weekly, monthly or the like). The technology logs included recorded actions/logged entries taken by a specific entity over the predetermined interval. The specific entity may be one or more users or one or more computing devices. In specific embodiments the plurality of technology logs include one comprehensive technology log for each of the specific entities, while in other embodiments of the invention, the plurality of technology logs include multiple technology logs for each specific entity with each of the multiple technology logs being specific to an action/logged event (e.g., web browsing, computer access, computer program execution, emails sent/received or the like).

Figure 6:
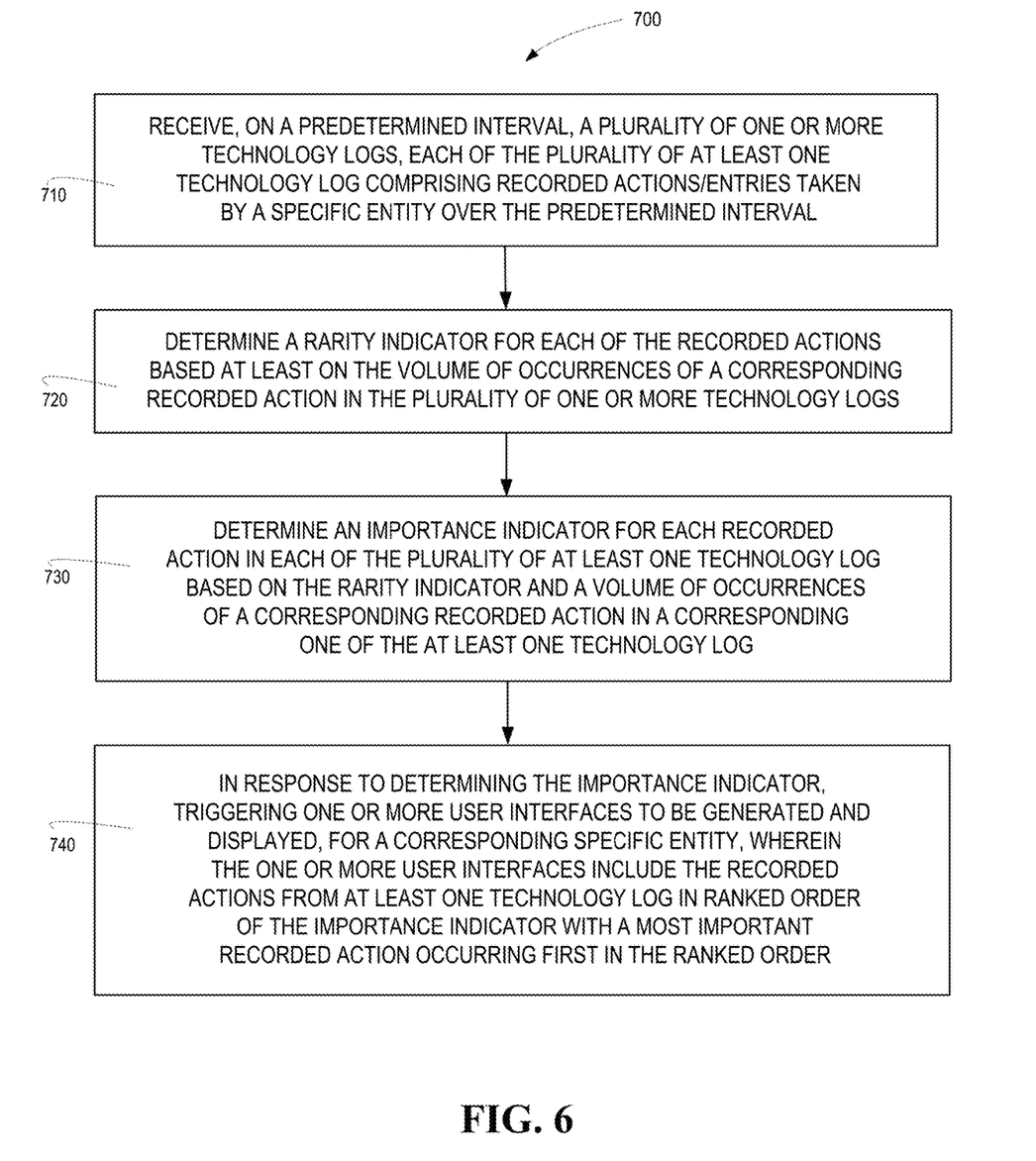
FIG. 6 is a flow diagram of a method for denoising technology logs and triggering display of user interfaces that provide an importance indicator-based ranked order of actions/logged entries, in accordance with embodiments of the present invention.

At Event 700, which may be implemented by application of a TF-IDF algorithm, a rarity indicator is determined for each of the actions in, at least, all of the plurality of received technology logs. The rarity indicator is based, at least, on the volume of occurrences of a corresponding recorded action in the plurality of technology logs. In other words, the rarity indicators are general to the entirety of the technology logs. In alternate embodiments of the invention, the determination of rarity indicators in not only based on the volume of occurrences of the recorded actions in the currently received technology logs but also based o the volume of occurrences in one or more previous predetermined intervals of the technology logs (e.g., last year or six months of technology logs or the like).

At Event 730, which may be implemented by application of a TF-IDF algorithm, an importance indicator is determined for each recorded action in each technology log. The importance indicator is based on the rarity indicator for a corresponding action/logged entry and the volume of occurrences of the corresponding action/logged entry in a corresponding one of the technology logs. In other words, the importance indicators are specific to one or more corresponding technology logs (i.e., specific to the entity that the one or more corresponding technology logs pertain to).

In response to determining the importance indicators, at Event 740, one or more user interfaces are generated and displayed for a corresponding one of the specific entities. The user interface(s) present the recorded actions from in least one of the technology logs in ranked order of the importance indicator (i.e., the most important recorded action/logged entry occurring first in the ranked order, where importance is defined by the rarity of the action in, at least, the most recently received plurality of technology logs and the volume of occurrences in a corresponding specific technology log). In one embodiment of the invention, a consolidated user interface is generated/displayed that includes all of an entity's recorded actions from multiple different technology logs in ranked order of importance indicators. In other embodiments of the invention, multiple user interfaces are generated/displayed that are each specific to a technology log (i.e., specific to a type of action).

As previously discussed, in specific embodiments of the method (not shown in FIG. 6), the importance indicators and/or the user interfaces are used as an input to determine whether the entity is a candidate for suspicious activity or otherwise a cause for concern.

Thus, present embodiments of the invention described provide denoising technology logs and presenting resulting user interfaces that display actions/log entries in ranked order of importance. Specifically, technology logs are received for a plurality of entities (e.g., users, devices, systems or the like). In response to receiving the technology logs, a rarity indicator is determined for the various recorded actions/entries in all of the received logs based on the number of occurrences in all of the received logs. Subsequently, an importance indicator is determined for each recorded action in a corresponding technology log based on the rarity indicator and the number of occurrences of the recorded action in the corresponding technology log. In response to determining the importance indicator, user interface(s) are generated and displayed that provide for the actions to be displayed in ranked order of their importance indicators. As a result, since the most important actions in the technology logs have been identified, meaningful analysis can be performed on the actions to readily and efficiently decipher whether or not the purpose of the analysis is met.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for denoising technology logs and displaying results thereof, the system comprising:
 a first computing platform including a first memory and one or more first computing processor devices in communication with the first memory, wherein the first memory stores a technology log denoising application that is executable by at least one of the one or more first computing processor devices and configured to:
 receive, on a predetermined interval, a plurality of technology logs, each of the plurality of technology logs comprising recorded actions taken by a specific entity over the predetermined interval,
 determine a rarity indicator for each of the recorded actions based at least on a volume of occurrences of a corresponding recorded action in the plurality technology logs,
 combine the plurality of technology logs into a consolidated technology log,
 determine an importance indicator for each of the recorded actions in the consolidated technology log based on the rarity indicators and a volume of occurrences of a corresponding action in the consolidated technology log; and
 a second computing platform including a second memory and one or more second computing processor devices in communication with the second memory, wherein the second memory stores a user interface application that is executable by at least one of the one or more second computing processor devices and configured to:
 in response to the technology log denoising application determining the importance indicators, trigger one or more user interfaces to be displayed, wherein each of the one or more user interfaces, for the specific entity, include the recorded actions from the plurality of technology logs in ranked order of the importance indicator with a most important recorded action occurring first in the ranked order.

2. The system of claim 1, wherein the user interface application is further configured to display, for the corresponding specific entity, one or more user interfaces that include the recorded actions from the plurality of technology logs in ranked order of the importance indicator with a most important recorded action occurring first in the ranked order, wherein the one or more user interfaces include (i) a single user interface that includes the recorded actions from the plurality of technology logs in ranked order of the importance indicator, or (ii) a plurality of user interfaces, each of the plurality of user interfaces including the recorded actions from one of the plurality of technology logs in ranked order of the importance indicator.

3. The system of claim 1, wherein the technology log denoising application is configured to determine the rarity indicator for each of the recorded actions based at least on (i) a volume of occurrences of a corresponding recorded action in the plurality of technology logs and (ii) a volume of occurrences of the corresponding recorded action in a another plurality technology logs received for at least one prior instance of the predetermined interval.

4. The system of claim 1, wherein the technology log denoising application is configured to determine the rarity indicator and the importance indicator using a Term-Frequency-Inverse Document Frequency (TF-IDF) algorithm.

5. The system of claim 4, wherein the technology log denoising application is configured to determine the rarity indicator and the importance indicator the using a Best Matching (BM) 25 Term-Frequency-Inverse Document Frequency (TF-IDF) algorithm.

6. The system of claim 1, wherein the specific entity is a technology user and the plurality of technology logs include one or more of (i) a computing device log that records computing devices accessed by the technology user, (ii) computer program log that records computing programs executing on the computing devices while accessed by the technology user, (iii) a computing device input log that records inputs made to the computing devices by the technology user, (iv) a website log that records websites accessed by the technology user, (v) one or more communication logs that record addresses or identifiers of who the technology user has communicated with, and (vi) one or more building access logs that record entries and exits into a building or a building area by the technology user.

7. The system of claim 6, further comprising a third computing platform including a third memory and one or more third computing processor devices in communication with the third memory, wherein the third memory stores a technology user investigation application that is configured to analyze, for the technology user, the importance indicators for the recorded actions in the consolidated technology log to determine whether the corresponding technology user is a candidate for suspicious activity investigation.

8. The system of claim 1, wherein the specific entity is a resource holding entity and the plurality of technology logs include logs that record technology actions taken by the resource holding entity.

9. The system of claim 1, wherein the specific entity is a resource account holder and the plurality of technology logs include logs that record resource account actions taken by the resource account holder.

10. A computer-implemented method for denoising technology logs and displaying results thereof, the computer-implemented method is executed by one or more computing processor devices and comprises:

receiving, on a predetermined interval, a plurality of technology logs, each of the plurality of technology logs comprising recorded actions taken by a specific entity over the predetermined interval;

determining a rarity indicator for each of the recorded actions based at least on a volume of occurrences of a corresponding recorded action in the plurality of technology logs;

combining the plurality of technology logs into a consolidated technology log;

determining an importance indicator for each of the recorded actions in the consolidated technology log based on the rarity indicators and a volume of occurrences of a corresponding action in the consolidated technology log; and in response to determining the importance indicators, triggering one or more user interfaces to be displayed, for the specific entity, wherein the one or more user interfaces include the recorded actions from the plurality of technology logs in ranked order of the importance indicator with a most important recorded action occurring first in the ranked order.

11. The computer-implemented method of claim 10, wherein determining the importance indicator further comprises implementing a Term-Frequency-Inverse Document Frequency (TF-IDF) algorithm to determine the rarity indicator and the importance indicator for each recorded action in each of the plurality of technology logs.

12. The computer-implemented method of claim 10, wherein the specific entity is a technology user and the plurality of technology logs include one or more of (i) a computing device log that records computing devices accessed by the technology user, (ii) computer program log that records computing programs executing on the computing devices while accessed by the technology user, (iii) a computing device input log that records inputs made to the computing devices by the technology user, (iv) a website log that records websites accessed by the technology user, (v) one or more communication logs that record addresses or identifiers of who the technology user has communicated with, and (vi) one or more building access logs that record entries and exits into a building or a building area by the technology user.

13. A computer program product comprising:

a non-transitory computer-readable medium comprising sets of codes for causing one or more computing processing devices to:

receive, on a predetermined interval, a plurality of technology logs, each of the plurality of technology logs comprising recorded actions taken by a specific entity over the predetermined interval;

determine a rarity indicator for each of the recorded actions based at least on a volume of occurrences of a corresponding recorded action in the plurality of technology logs;

combining the plurality of technology logs into a consolidated technology loci;

determine an importance indicator for each of the recorded actions in the technology log based on the rarity indicators and a volume of occurrences of the consolidated technology log; and in response to determining the importance indicator, trigger one or more user interfaces to be displayed, for the specific entity, wherein the one or more user interfaces include the recorded actions from the plurality of technology logs in ranked order of the importance indicator with a most important recorded action occurring first in the ranked order.

14. The computer program product of claim 13, wherein the set of codes for causing the one or more computing processing devices to wherein determine the importance indicator further comprises the set of codes for causing the one or more computing processing devices to implement a Term-Frequency-Inverse Document Frequency (TF-IDF) algorithm to determine the rarity indicator and the importance indicator for each recorded action in each of the plurality of technology logs.

* * * * *